Feb. 18, 1958 V. L. JOHANNESSEN ET AL 2,823,592
APPARATUS FOR BROACHING ARTICLES
Filed Dec. 30, 1953 2 Sheets-Sheet 2
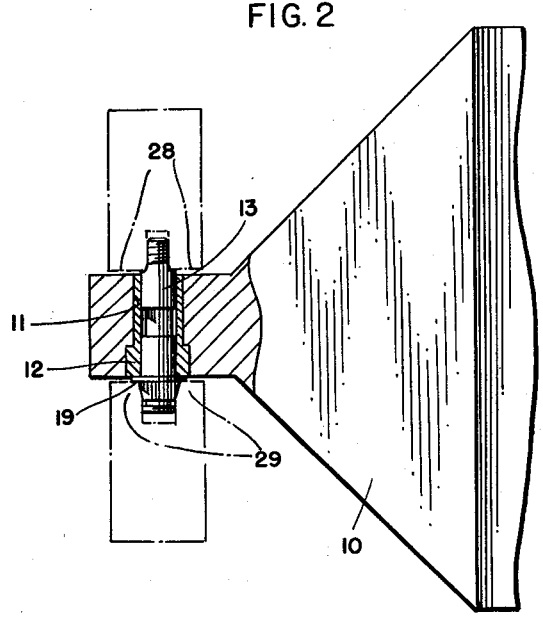
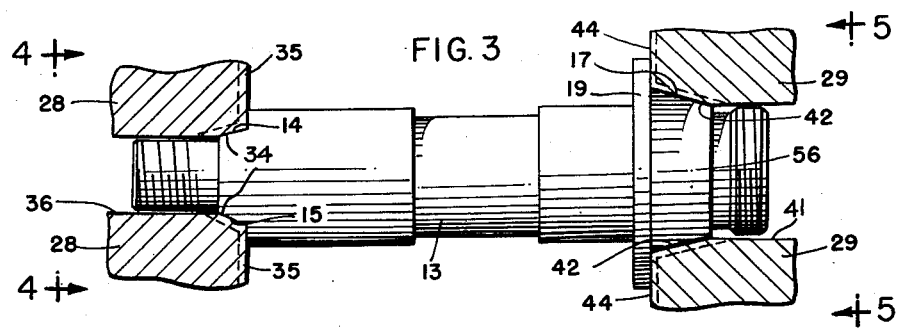
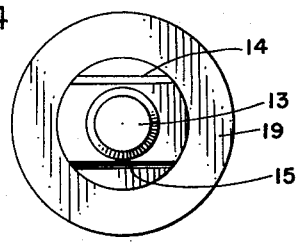
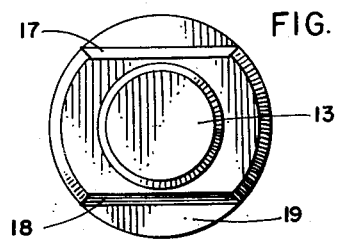
INVENTORS:
V. L. JOHANNESSEN
D. B. SWEELY
BY C. B. Hamilton
ATTORNEY United States Patent Office 2,823,592
Patented Feb. 18, 1958

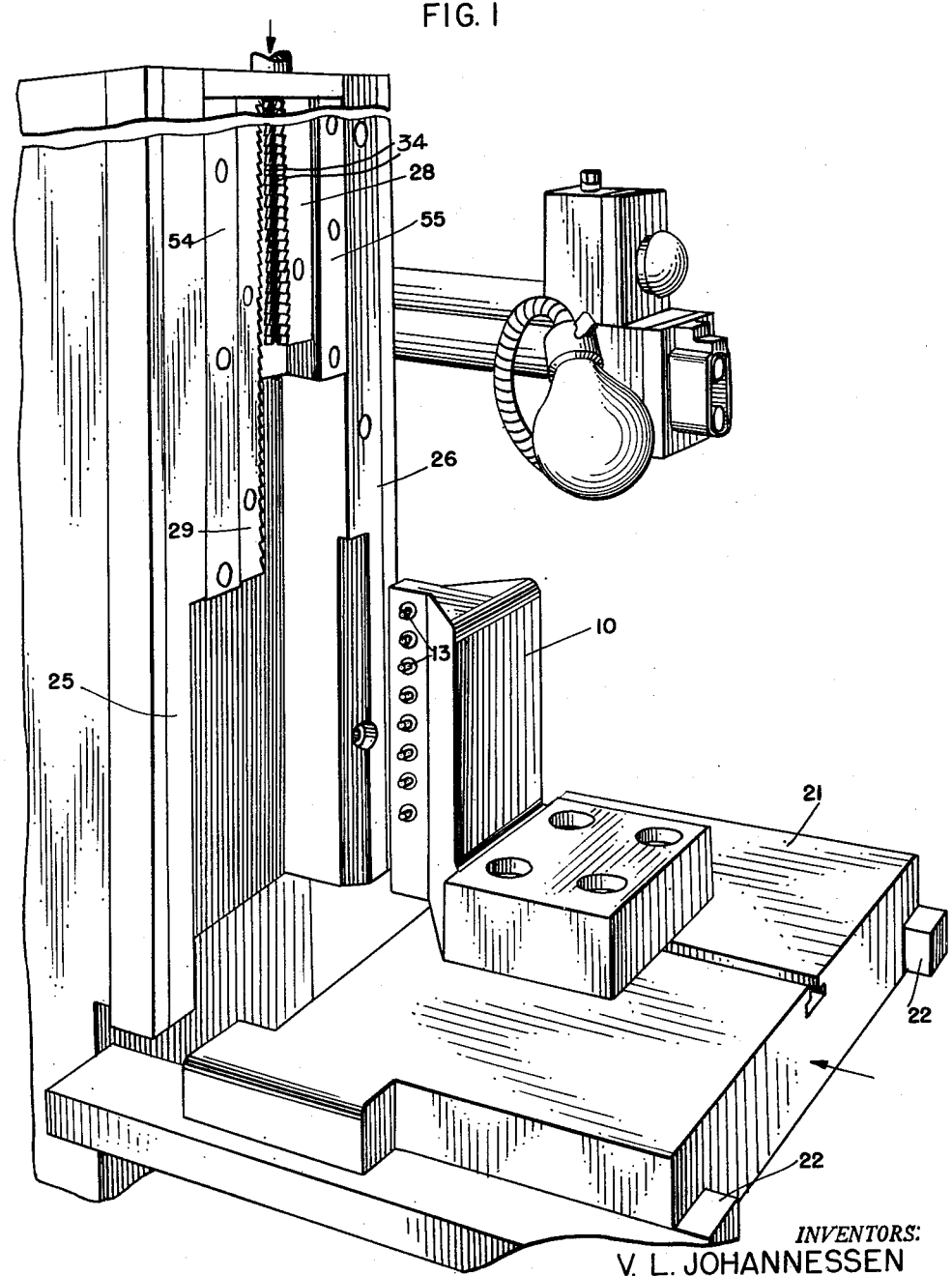

2,823,592

APPARATUS FOR BROACHING ARTICLES

Vaughn L. Johannessen and Donald B. Sweely, Indianapolis, Ind., assignors to Western Electric Company, Incorporated, New York, N. Y., a corporation of New York Application December 30, 1953, Serial No. 401,168

3 Claims. (Cl. 90—33)

This invention relates to apparatus for broaching articles, and more particularly to apparatus for broaching flats on opposite sides of shafts.

An object of the invention is to provide new and improved apparatus for broaching articles.

Another object of the invention is to provide apparatus for broaching flats on opposite sides of shafts.

A further object of the invention is to provide simple, sure, and inexpensive apparatus for holding round articles and broaching flats on opposite sides of the articles.

A broaching apparatus illustrating certain features of the invention may include a pair of broaches mounted in parallel, spaced-apart positions, each of said broaches being provided with teeth one one side thereof directed the same as the teeth on the other broach. A holder provided with sockets therein is designed to receive shafts to be broached and to be moved into alignment with and center the shafts in alignment with the space between the two broaches. Means are provided for moving the broaches across the end of the shaft and progressively pressing the edges of the broach along the shaft to cut flats on the shaft and keep the shaft from turning as it is broached.

A complete understanding of the invention may be obtained from the following detailed description of a broaching apparatus forming a specific embodiment of the invention, when read in conjunction with the appended drawings, in which Fig. 1 is a fragmentary, perspective view of a broaching apparatus forming one embodiment of the invention;

Fig. 2 is a fragmentary, horizontal section of a portion of the apparatus shown in Fig. 1;

Fig. 3 is a horizontal section of a portion of the apparatus shown in Fig. 1;

Fig. 4 is a side elevation of an article broached shown in Fig. 1, taken along the line 4—4 of Fig. 3, and Fig. 5 is an enlarged side elevation of the article taken along the line 5—5 of Fig. 3.

Referring now in detail to the drawings, there is shown therein a workholder 10 provided with a row of bores 11, in each of which is mounted a bushing for receiving a shaft 13, which is to have flats 14 and 15 formed on opposite sides of the lefthand end of the shaft 13, as viewed in Fig. 3, and flats 17 and 18 formed on opposite sides of the righthand end of the shaft. Each shaft 13 also is provided with a flange 19. The holder 10 receives the shafts 13 in the bushings 12, which mount the shafts rotatably in the bushings, but limit, with the flanges 19, longitudinal movement of the shafts 13.

The holder 10 is mounted on a carriage 21 movable along ways 22 to move the shafts 13 between vertical guideways 25 and 26 to locate the ends of the shafts 13 in centered positions relative to opposed broaches 28 and 29, respectively. The broaches 28 are parallel to one another and are provided with angular teeth 34 opposed somewhat to one another, and each also has teeth 35 facing in the same direction as the corresponding teeth on the other broach 28. A clearance space 36 is provided between the broaches 28. The broaches 29 are spaced apart so as to provide a clearance space 41, and each has teeth 42 generally opposed to the teeth 42 on the other broach and also have teeth 44 facing the same general direction on the sides of the broaches 29 nearest the broaches 28.

The broaches 28 are mounted on a slide 55 slidable on the standard 26, and broaches 29 are secured rigidly to a slide 54 slidable along the standard 25 in a vertical direction, as viewed in Fig. 1. Suitable power means of a well-known type (not shown), such as a cylinder or the like, are provided for moving the slides 54 and 55 as a unit downwardly along the standards 25 and 26 in a working stroke and for moving the broaches upwardly to their position shown in Fig. 1 in a retracting stroke.

Operation

In the operation of the apparatus described above, the shafts 13 are placed in the bushings 12, and the carriage 21 is moved to the left, as viewed in Fig. 1, to place the bushings in a position centered between the broaches 28 and 29. The power means then is actuated to move the slides 54 and 55 downwardly. The broaches 29 are lower than the broaches 28 and first engage the large portion 56 of the shaft 13, the teeth 44 barely touch the uppermost shaft 13 and begin to cut into the portion 56 of the shaft engaged thereby on opposite sides of the axis of the shaft 13. The forces exerted on the shaft offset one another insofar as torque is concerned so as to prevent turning of the shaft 13.

The broaches 29 extend down below the broaches 28 and engage their ends of the shaft 13 and shove the flanges 19 up against the holder end and initiate their cutting prior to engagement of the other ends of the shaft by the broaches 28, and then the broaches 28 engage their ends of the shaft, the flat formed on the righthand end of the shaft, as viewed in Fig. 3, serving to key the shaft so that the the flats 14 and 15 are oriented with respect to the flats 17 and 19 on the shafts 13. As the broaches 28 and 29 continue to move downwardly, they cut further along the shaft 13 until the flats 14 and 15 and 17 and 18 are fully formed, and, after this has been accomplished, the slides 54 and 55 are raised completely out of engagement with the shaft 13, the carriage 21 is moved to the right, as viewed in Fig. 1, and the finished shafts 13 are pulled manually from the bushings 12.

The above-described apparatus serves to cut the four flats 14 and 15 and 17 and 18 on the ends of the shafts 13 without keying the shafts to the holder 10, and the flats are perfectly oriented with respect to one another. The holder 10 may be rapidly loaded and unloaded inasmuch as no keying or clamping operations thereon are necessary, all that is required being to insert the shafts 13 into the bushings.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A broaching apparatus, which comprises a vertical guideway, a pair of broaches, means for mounting said pair of broaches for vertical movement along one side of the guideway and extending along said side of the guideway in positions in which each of the broaches faces at least partially toward the other side of the guideway and the broaches are spaced apart, a second pair of broaches, means mounting the second pair of broaches on the side of and extending along the guideway opposite to that at which the first pair of broaches are mounted in positions in which the broaches of the second pair are spaced apart, said mounting means serving to mount the pairs of broaches in positions in which the lower ends of the first pair of broaches extend downwardly beyond the lower ends of the second pair of broaches, a holder provided with a series of bores therethrough in a vertical row for receiving shafts each having a flange near one end only thereof in positions in which the ends of the shafts extend beyond the sides of the holder in alignment with the spaces between the pairs of broaches and the flanged end of each shaft is on the side of the holder nearer to the first pair of broaches, and means for moving the broaches downwardly into engagement with the ends of the shafts held by the holder, each of said first pair of broaches having teeth in a row at an angle partially facing the teeth of the other broach of the first pair and partially facing the holder to seat the flange of each shaft against the holder.

2. In an apparatus for forming flat surfaces on peripheral areas of a cylindrical work piece having a flange, a work holder having a bore therein larger in diameter than the diameter of the work piece positioned therein, said work holder being shorter than the work piece so that the ends thereof and the flange extend beyond the work holder, a first pair of broaches, means for slidably mounting the broaches above one end of the work piece, said broaches having cutting teeth formed thereon at oppositely disposed angles to each other, a second pair of broaches, means for slidably mounting the second broaches above the other end of the work piece at a distance greater than the first pair of broaches, said second broaches having teeth formed thereon facing each other, and means for simultaneously moving said four broaches toward the work piece whereupon the first pair of broaches engage and apply opposite torques to hold said work piece against rotation while longitudinally sliding the work piece to move the flange thereon against the rim of the bore whereafter said second pair of broaches engage said other end of the work piece.

3. In an apparatus for forming flat surfaces on a cylindrical work piece, said work piece being provided with a flange spaced from one end thereof, a work holder having a bore therein for rotatably supporting a work piece therein, said work holder positioning the work piece so that the flange engages the rim of the bore and both ends extend beyond the work holder, a first pair of broaches spaced apart and having teeth therein at oppositely disposed angles with respect to the axis of the bore in the work holder, means for slidably mounting the broaches to engage diametrically opposed sections of the flanged end of a work piece positioned in the bore of the work holder, a second set of teeth formed on said broaches at right angles to the axis of the bore in the work holder and positioned to act upon the flange of the work piece, a second pair of broaches having teeth thereon at oppositely disposed angles with respect to the bore in the work holder, means for slidably mounting the second broaches at diametrically opposed positions with respect to the other end of the work piece and at a distance greater than the distance that the first broaches are mounted with respect to the work piece, and means for simultaneously moving said broaches toward the work piece whereby the first pair of broaches engage oppositely disposed sections of the work piece and the flange to hold said work piece from rotation and longitudinally force the flange against the rim of the bore to hold said work piece stationary whereafter the second broaches engage the stationarily held work piece.

References Cited in the file of this patent
UNITED STATES PATENTS

| | | |
|---|---|---|
| 572,376 | Roberts | Dec. 1, 1896 |
| 1,198,967 | Stempert | Sept. 19, 1916 |
| 1,815,647 | Blood | July 21, 1931 |
| 1,937,887 | Halborg | Dec. 5, 1933 |
| 2,101,624 | Muller | Dec. 7, 1937 |
| 2,511,912 | Georse | June 20, 1950 |
| 2,631,501 | Welte | Mar. 17, 1953 |